US011951699B2

(12) United States Patent
Maas et al.

(10) Patent No.: US 11,951,699 B2
(45) Date of Patent: Apr. 9, 2024

(54) METHOD AND ASSEMBLY FOR FORMING AN INTRAOCULAR LENS

(71) Applicant: AMO Groningen B.V., Groningen (NL)

(72) Inventors: Mitchell Gerardus Maas, Gilze (NL); Martin Dinant Bijker, Gilze (NL)

(73) Assignee: AMO Groningen B.V., Groningen (NL)

( * ) Notice: Subject to any disclaimer, the term of this patent is extended or adjusted under 35 U.S.C. 154(b) by 169 days.

(21) Appl. No.: 17/444,526

(22) Filed: Aug. 5, 2021

(65) Prior Publication Data

US 2023/0038204 A1 Feb. 9, 2023

(51) Int. Cl.
*B29D 11/00* (2006.01)
*B29C 33/12* (2006.01)
*B29C 45/26* (2006.01)
*B29L 11/00* (2006.01)

(52) U.S. Cl.
CPC ........ *B29D 11/00509* (2013.01); *B29C 33/12* (2013.01); *B29C 45/26* (2013.01); *B29D 11/00942* (2013.01); *B29L 2011/0025* (2013.01)

(58) Field of Classification Search
CPC .... B29C 2049/2095; B29C 2793/0009; B29C 48/21; B29C 48/22; B29C 48/23; B29C 51/268; B29C 51/32; B29C 51/445; B29C 53/8091; B29C 69/001; B29C 70/545
See application file for complete search history.

(56) References Cited

U.S. PATENT DOCUMENTS

| | | | |
|---|---|---|---|
| 4,350,864 A | 9/1982 | Janicke et al. | |
| 4,737,322 A | 4/1988 | Bruns et al. | |
| 4,808,181 A | 2/1989 | Kelman | |
| 6,585,768 B2 | 7/2003 | Hamano et al. | |
| 8,758,435 B2 | 6/2014 | Doraiswamy et al. | |
| 9,089,419 B2 | 7/2015 | Downer et al. | |
| 9,566,749 B2 | 2/2017 | Van Dijk | |
| 11,267,059 B2 * | 3/2022 | Nakashima | G05B 13/0265 |
| 2006/0038308 A1 * | 2/2006 | Reed | B26F 1/3846 264/2.7 |
| 2009/0127726 A1 * | 5/2009 | Spalding | B29C 33/48 425/588 |
| 2012/0032361 A1 | 2/2012 | Graney et al. | |
| 2019/0358026 A1 | 11/2019 | Ishikawa et al. | |

FOREIGN PATENT DOCUMENTS

EP 3027398 B1 1/2019
WO 2017012311 A1 1/2017

* cited by examiner

*Primary Examiner* — Stella K Yi
(74) *Attorney, Agent, or Firm* — Johnson & Johnson Surgical Vision, Inc.

(57) ABSTRACT

A method of forming a mold insert used to produce an intraocular lens (IOL) mold is disclosed herein. The method includes providing stock material and cutting the stock material, which includes multiple cutting steps. The cutting steps are performed on transitional regions of supporting portions of the mold insert. Peripheral surfaces of the mold insert have varying roughness values, and supporting portions of the mold insert have a greater roughness than the optical portion of the mold insert. An IOL is also disclosed herein that is formed using an IOL mold that is injection molded using the mold insert. A method of forming the IOL is also disclosed herein.

10 Claims, 20 Drawing Sheets

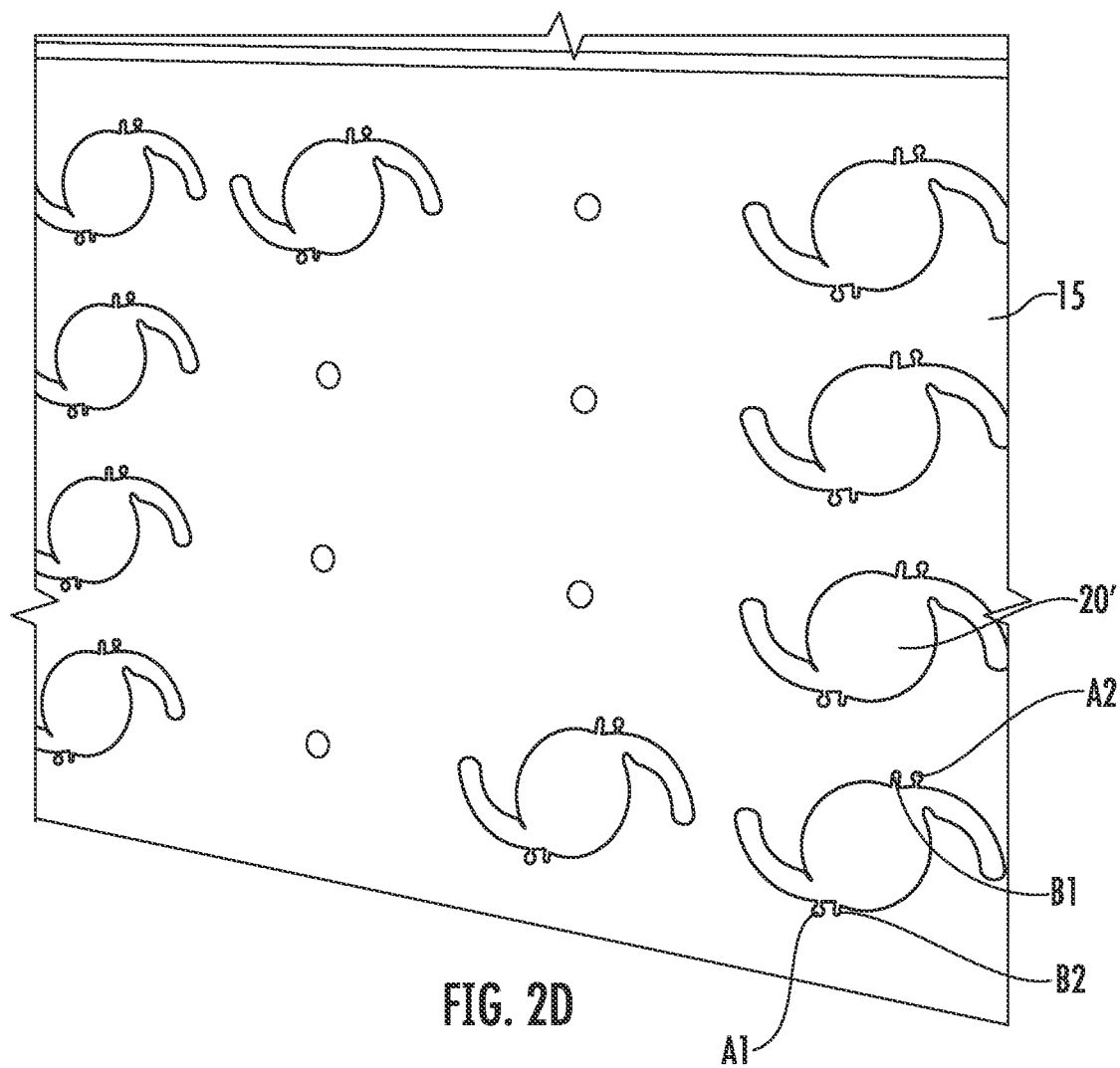

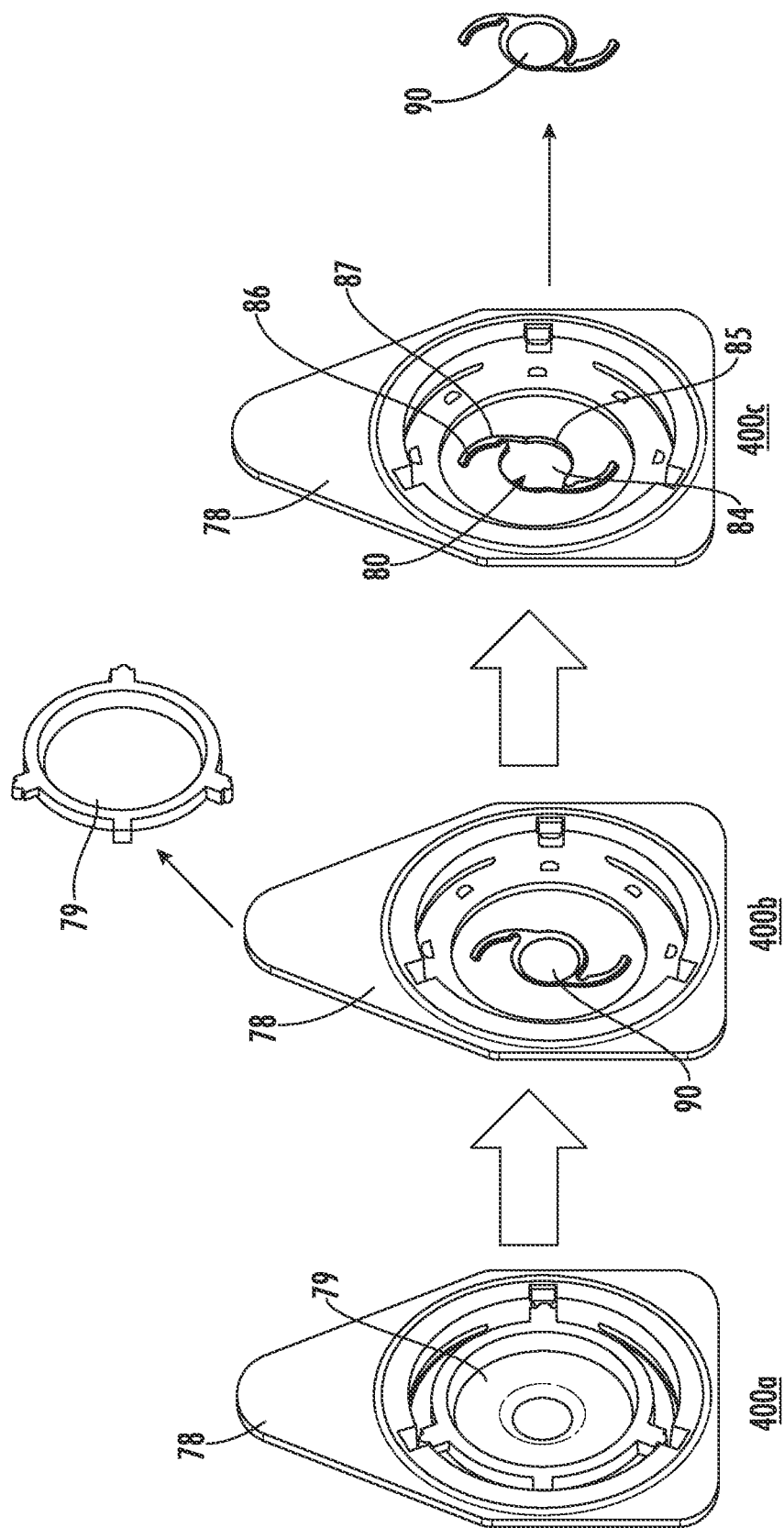

METHOD AND ASSEMBLY FOR FORMING AN INTRAOCULAR LENS

FIELD OF INVENTION

The present disclosure relates to an intraocular lens (IOL), and more specifically relates to formation methods and processes for producing the IOL.

BACKGROUND

Intraocular lenses (IOLs) are well known. There are many varieties of IOLs, such as toric IOLs, monofocal IOLs, and multifocal IOLs. IOLs can be formed from a variety of formation processes, which may include milling, molding, and lathing, among many other processes.

IOLs typically include an optical portion and a supporting portion. One type of a supporting portion is known as a haptic portion. It has been recognized that frosting of supporting portions can be desirable in order to address issues with rotation of the IOL and also to address undesirable glare issues. Forming IOLs to have a specific roughness or surface characteristics specifically on the supporting portions is time consuming, labor intensive, and expensive.

Accordingly, there is a desire for an improved formation process of an IOL and the associated components used to form the IOL in order to provide support portions on the IOL with specific surface characteristics. There is also a desire to provide an improved formation method for an IOL that avoids scarring or other imperfections that can manifest on the optical portion of the IOL.

SUMMARY

In one aspect, a method of forming a mold insert used to produce an IOL mold is disclosed. The method includes cutting stock material, which involves a variety of cutting steps. The cutting steps are performed in specific start locations and end locations on the mold insert. In one aspect, the cutting steps are performed using electrical discharge machining (EDM) wire cutting.

A method of forming an IOL is also disclosed herein. The method includes providing a molding assembly including the mold insert. The method includes forming an IOL mold from the molding assembly. The method then includes forming the IOL from the IOL mold.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 2D illustrates stock material with multiple mold inserts removed.

FIG. 4C illustrates aspects of cast molding an IOL from the IOL mold.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. The term "approximately" as used herein with respect to values or dimensions means within +/−10% of the recited value or dimension.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Throughout this disclosure, the term lens is used generically. In one aspect, the lens is an intraocular lens (IOL). More specifically, the lens is a toric IOL in one embodiment. However, one skilled in the art would understand based on the present disclosure that the embodiments and aspects disclosed herein can be adapted or used with respect to any lens or implant related to the eye.

Figure 1A:
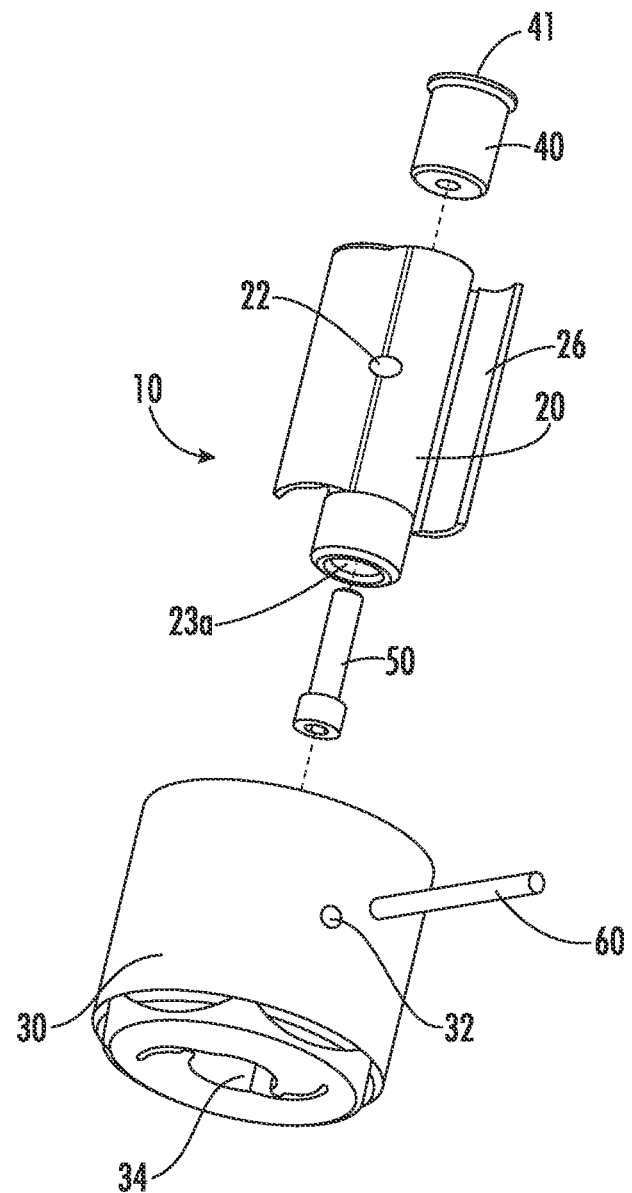
FIG. 1A is an exploded view from a bottom perspective of a molding assembly according to one aspect of this disclosure.
Figure 1B:
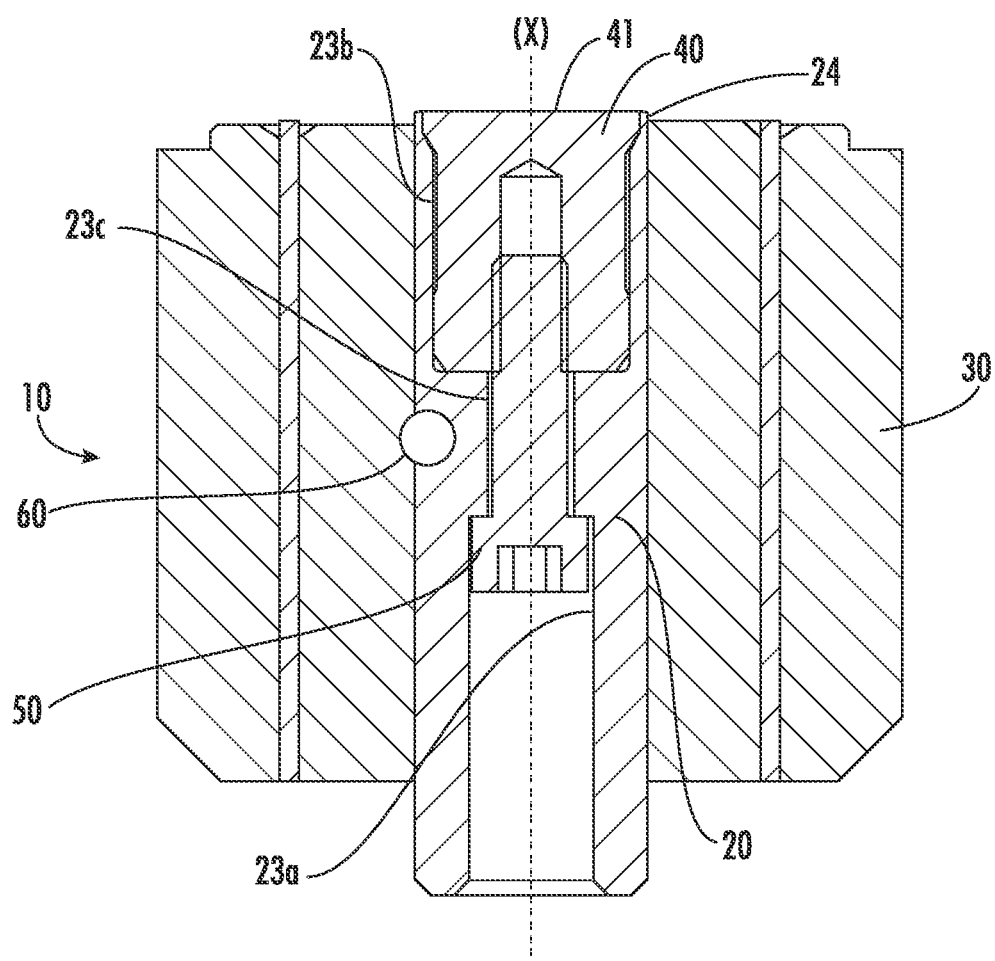
FIG. 1B is a side cross-sectional view of the molding assembly of FIG. 1A.
Figure 1C:
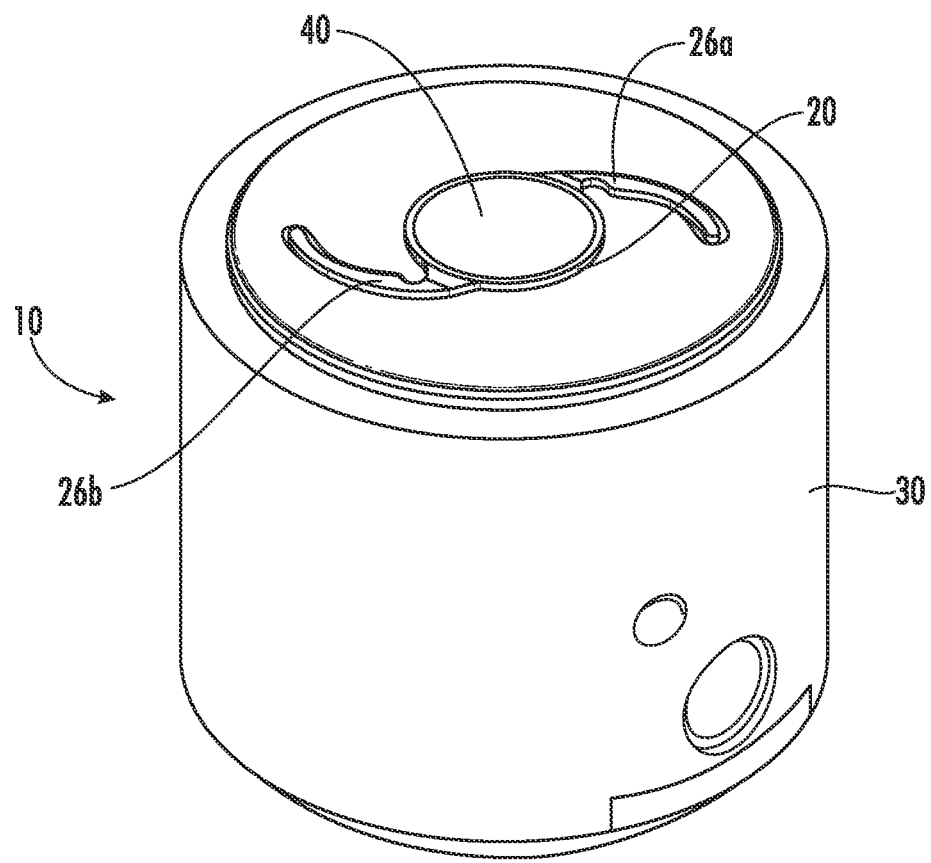
FIG. 1C is a top perspective view of the molding assembly of FIGS. 1A and 1B.

As generally shown in FIGS. 1A-1C, a molding assembly 10 is disclosed. FIG. 1A is an exploded view of the molding assembly 10 from a bottom perspective. The molding assembly 10 includes a mold insert 20, a body portion 30, an optical insert 40, a fastening element 50, and a securing element 60. These components are assembled with each other to form the molding assembly 10, which is used in an injection molding process to form an IOL mold, as described in more detail herein. The IOL mold is then used to form the IOL itself, which is also described in more detail herein. In one aspect, the mold insert 20 and the optical insert 40 combine with each other to define a profile for an IOL mold, which is ultimately used to form an IOL. The optical insert 40 can be configured to be arranged substantially inside of the mold insert 20, as shown in FIG. 1B. In this configuration, an optically accurate portion 41 of the optical insert 40 defines an uppermost surface of the molding assembly 10. The optically accurate portion 41 refers to a portion of the optical insert 40 that ultimately defines the optical portion of the IOL. In one aspect, the mold insert 20 is directed to forming the supporting portions of the IOL mold and IOL, and a profile for a periphery of the IOL mold and IOL. The optical insert 40 is directed to forming the optical portion of the IOL mold and IOL. One of ordinary skill in the art would understand that the optical insert 40 can have a different profile than the profile shown in the drawings. For example, the optical insert 40 may not have a circular profile, and instead could include a circular profile that also includes support portions or haptic portions. In one embodiment, the mold insert 20 and the optical insert 40 can be formed as a single component.

The body portion 30 generally defines a passage 34 on a longitudinal or axial end that is configured or dimensioned to receive the mold insert 20. In one aspect, a surface roughness defined by the internal wall of the passage 34 is approximately the same as the roughness defined around a perimeter of the mold insert 20. One skilled in the art would understand that the internal wall of passage 34 is formed such that insertion of the mold insert 20 within the passage 34 will not contact or otherwise damage the mold insert 20. In one aspect, a lateral surface of the passage 34 has an identical roughness value as a roughness value of a lateral surface of the mold insert 20. In one aspect, the lateral surface of the passage 34 has a roughness value that is less than a roughness value of the lateral surface of the mold insert 20. In another aspect, a lateral surface of the passage 34 has a roughness value that is within 1%-5% of a roughness value of a lateral surface of the mold insert 20. In one aspect, a lateral surface of the passage 34 has a roughness value that is within 20%-30% of a roughness value of a lateral surface of the mold insert 20

The mold insert 20 includes an opening 22 on a radial or peripheral surface configured to receive the securing element 60. The body portion 30 also includes an opening 32 on a radial or peripheral surface configured to receive the securing element 60. The openings 22, 32 are aligned with each other once the mold insert 20 is arranged inside the body portion 30, and the securing element 60 is inserted to secure the mold insert 20 with the body portion 30. In one aspect, the securing element 60 is a pin or dowel. One skilled in the art would recognize from this disclosure that various types of securing elements can be used. The securing element 60 and the opening 32 are specifically formed to avoid any burr or imperfections, which could potentially scratch mold insert 20 during assembly. Any scratches or unintended imperfections imparted onto the mold insert 20 can result in imperfections later translated or molded onto the lens. The present disclosure avoids these issues using the techniques described herein.

The mold insert 20 also includes a first opening 23a on an axial end face and a second opening 23b on axial end face opposite from the first opening 23a. The first opening 23a is configured to receive the fastening element 50. The second opening 23b is configured to receive the optical insert 40. As shown in FIG. 1B, the two openings 23a, 23b are connected by a through passage 23c that is dimensioned to also receive a portion of the fastening element 50. As shown in FIG. 1B, an optical portion 24 of the mold insert 20 surrounds a periphery of the optical insert 40. The optical portion 24 is disclosed in more detail herein.

Once the mold insert 20 is arranged inside of the body portion 30, then the optical insert 40 and the fastening element 50 are arranged on axially opposite ends of the assembly 10 and secured with each other to provide a secure and reliable connection between the components of the assembly 10. In this configuration, the optically accurate portion 41 of the optical insert 40 is facing outwards, as shown in FIG. 1B. In one aspect, the fastening element 50 comprises a screw or male threaded element, and the optical insert 40 comprises a nut or female threaded element configured to engage with the fastening element 50. The openings 23a, 23b and through passage 23c allow for the connection between the optical insert 40 and the fastening element 50, in one aspect. One skilled in the art would understand that various types of fastening configurations could be used, such as a connection using magnetic elements or a press fit arrangement.

The mold insert 20 comprises the optical portion 24 defined in a central region of the mold insert 20 and at least one supporting portion 26 that extends away from the optical portion 24. In one embodiment, the supporting portion can be a haptic arm 26 or haptic portion, and these terms are used interchangeably herein. One skilled in the art would understand based on this disclosure that the supporting portion or structure can have a variety of shapes, structure, profiles, etc. The term supporting portion as used herein refers to portions of the mold insert other than the optical portion which ultimately assist with positioning or orienting the IOL.

In one aspect, there are two supporting portions 26a, 26b arranged on diametrically opposed areas of the optical portion 24. In one aspect, the supporting portions are formed as haptic arms 26a, 26b with an arcuate profile that bends or curves in opposite directions from each other. One skilled in the art would understand from the present disclosure that the shape, profile, quantity, and arrangement of the supporting portions or haptic arms 26a, 26b can vary. Details regarding the formation of these components of the mold insert 20 are further defined herein.

Figure 7:
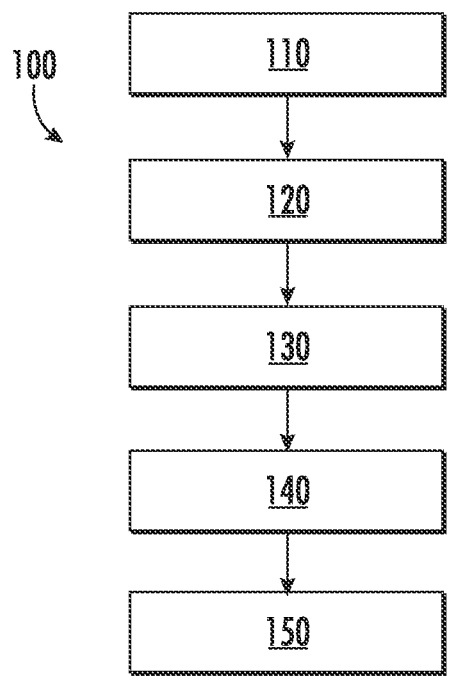
FIG. 7 illustrates a flow chart detailing method steps associated with preparing or forming the mold insert.

In one aspect, as shown in FIG. 7, a method 100 of preparing or forming the mold insert 20 is disclosed herein. Step 110 includes providing stock material. As used herein, the term stock material refers to a base material, which can be provided in the form of a block, a sheet, or any other form. In one aspect, the stock material is comprised of metal, a metallic alloy, steel, or other suitable material. In one aspect, the stock material is stainless steel having a Rockwell hardness (HRC) of 52-54 after processing and hardening. The hardness of the stock material is increased during processing/hardening from an initial value of 20 HRC to the final value of 52-54 HRC.

In one aspect, the stock material is provided in sheet, block or raw form. As an initial step, the first opening 23a can be formed. In another step, the second opening 23b can be formed. These openings 23a, 23b can formed by tapping, drilling, or any other formation processes or steps. In one aspect, additional elements, such as alignment features or holes, can be formed on the stock material. In one step, the stock material can be hardened, preferably to a HRC of 52-54. After these steps, the stock material can then be cut using a wire cutting pattern, which is described in more detail herein, i.e. step 120 below.

Figure 2A:
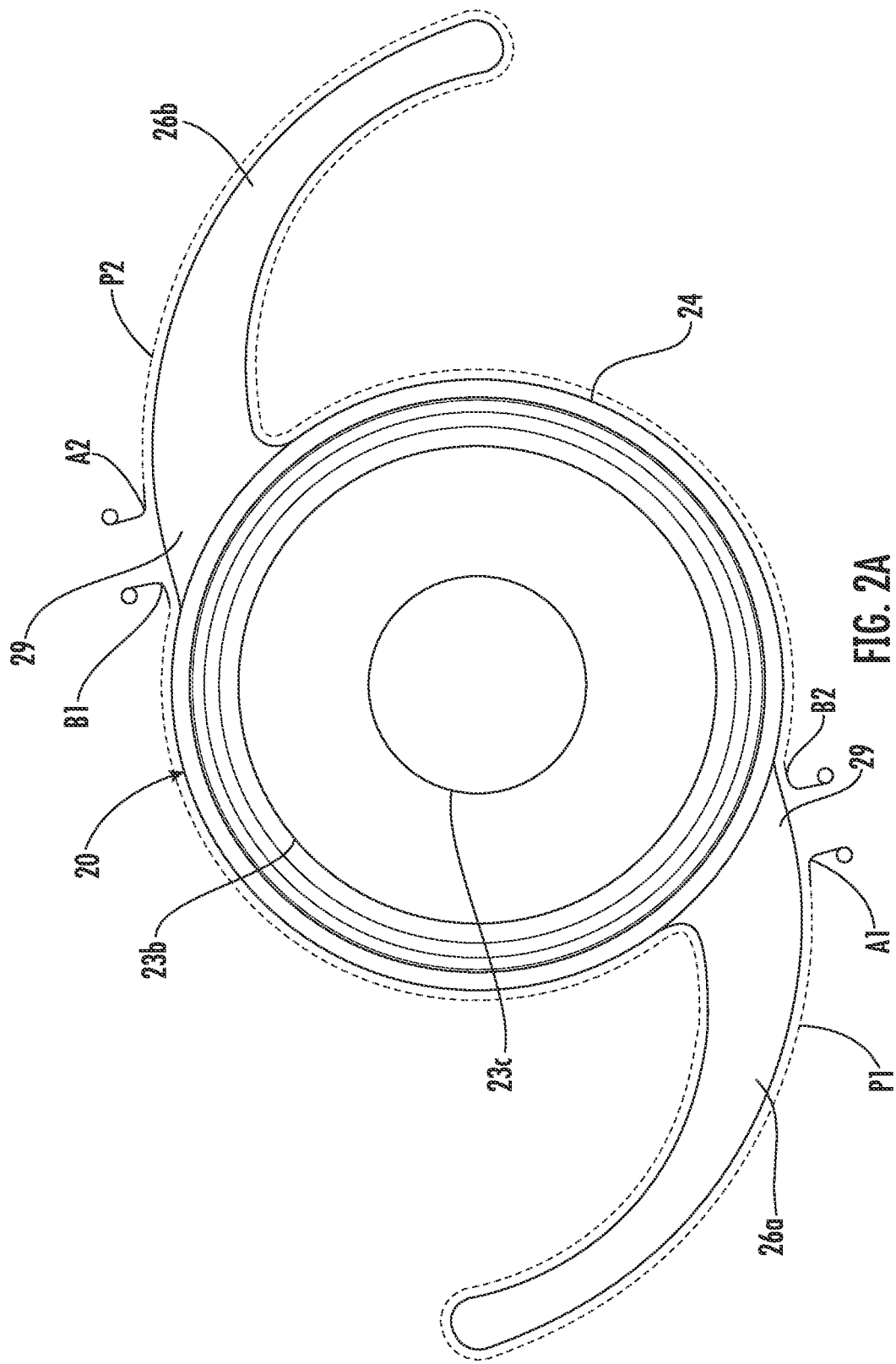
FIGS. 2A-2C illustrate various cutting steps for forming a mold insert for the molding assembly.
Figure 2B:
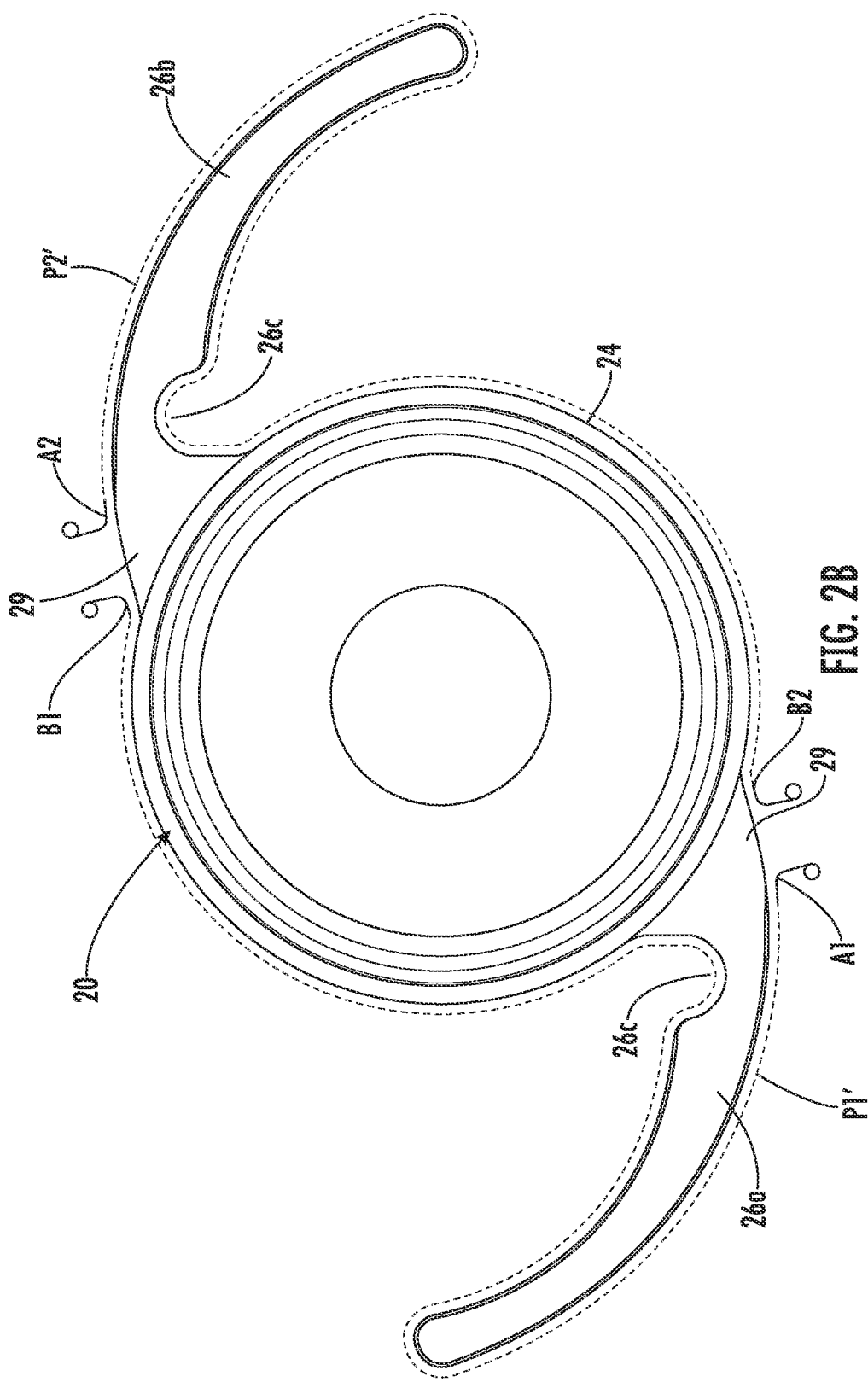
Figure 2C:
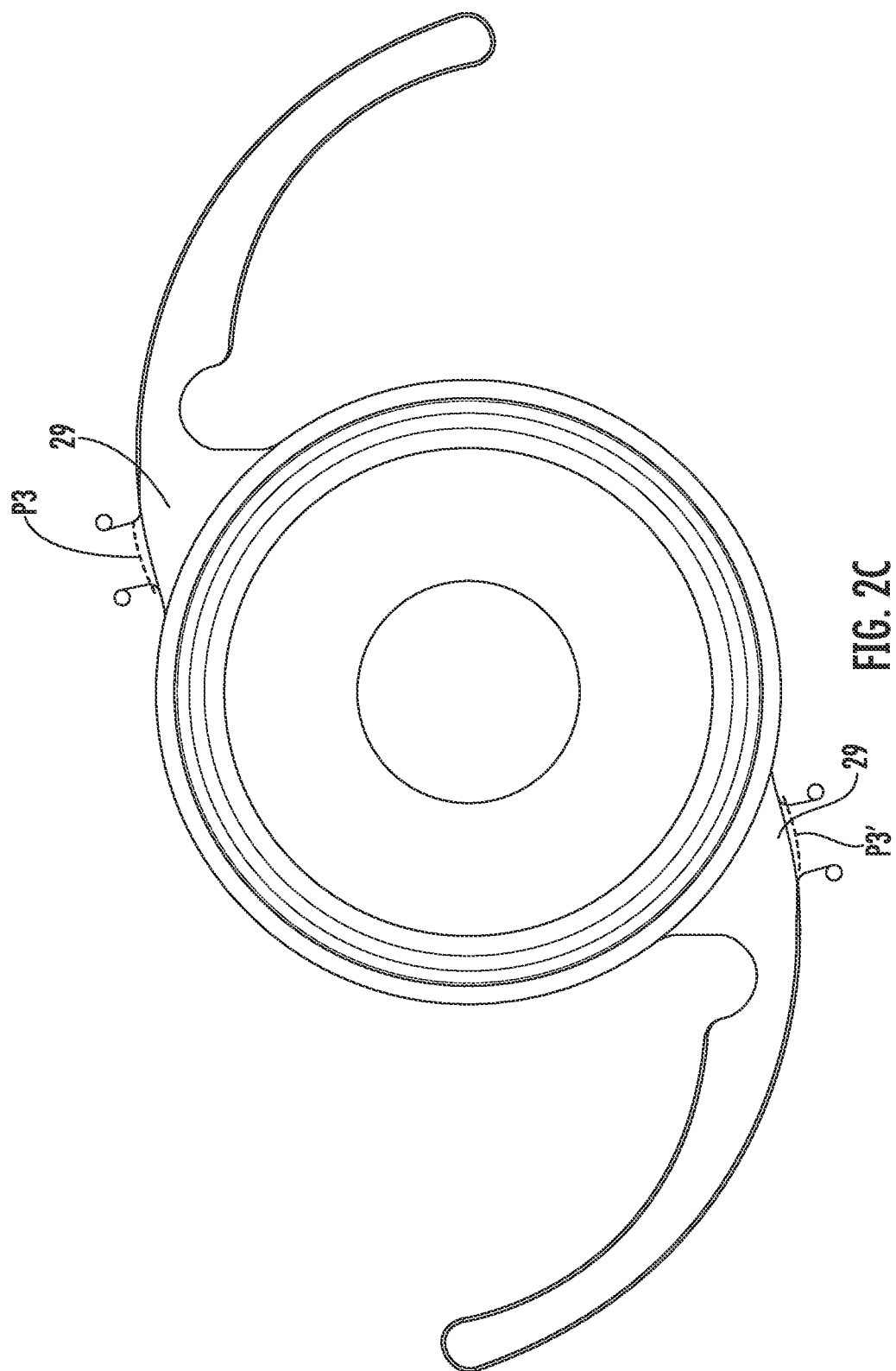

Step 120 includes cutting the stock material using a variety of cutting steps, patterns, and techniques, as generally illustrated in FIGS. 2A-2C and 2E. FIGS. 2A-2C specifically illustrates cutting profiles relative to the mold insert 20 and do not illustrate the surrounding stock material for clarity purposes only. One skilled in the art would understand that the cutting steps shown in these Figures would be performed relative to the workpiece or stock material.

In one aspect, step 130 includes performing a first cut or cutting step around a first predetermined periphery of the mold insert 20. This cutting step is shown in FIG. 2A. Each of the cutting steps described herein can be performed using electrical discharge machining (EDM). More specifically, the cutting steps can be performed using wire-cutting EDM. One skilled in the art would understand that the cutting steps can be performed using other types of cutting procedures and equipment. In one aspect, a pre-cut can be performed in which a rough cutting around a general shape of the mold insert 20 is performed.

Step 140 includes performing a second cut or cutting step around a second predetermined periphery of the mold insert 20. This cutting step is shown in FIG. 2B. In one aspect, the second predetermined periphery has a more detailed profile than a profile of the first predetermined periphery. For example, the second predetermined periphery includes cutting around the mold insert 20 such that indentations, recesses, or grooves 26c are defined in regions between the optical portion 24 and the supporting portions 26. These recesses are also referred to as pits 26c of the supporting portions 26 or armpits 26c.

Additional steps of method 100 can be provided. For example, after the cutting steps, other features of the mold insert 20 can be further processed or formed. In one aspect, milling steps can be carried out, which may include high speed milling (HSM) (i.e., 30,000 rpm) with diamond cutting tools. In a further step, the opening 22 for the securing element 60, i.e. a dowel pin, is formed.

In one aspect, as shown in FIGS. 2A and 2B, the first cut and the second cut are each performed using: (i) a first cutting path (P1, P1') with a starting point or position (A1) on a first arm or supporting portion 26a of the mold insert 20 and a stopping point or position (B1) on a second arm or supporting portion 26b of the mold insert 20, and (ii) a second cutting path (P2, P2') with a starting point or position (A2) on the second arm or supporting portion 26b of the mold insert 20 and a stopping point or position (B2) on the first arm or supporting portion 26a of the mold insert 20. In other words, the first and second cutting paths each begin in regions away from the optical portion 24, and the first and second cuts are each performed using two different cutting paths with two different entry and exit points for the cutting wire. The first cutting path and the second cutting path are diametrically situated relative to each other along the mold insert 20, in one aspect. The first and second cutting paths are each performed for 160°-180° around a periphery of the mold insert 20. In one aspect, each of the first and second cutting paths are performed around 45%-49% of a periphery of the mold insert 20. An extent or length and duration of the first and second cutting paths are equal to each other, in one embodiment.

Figure 3:
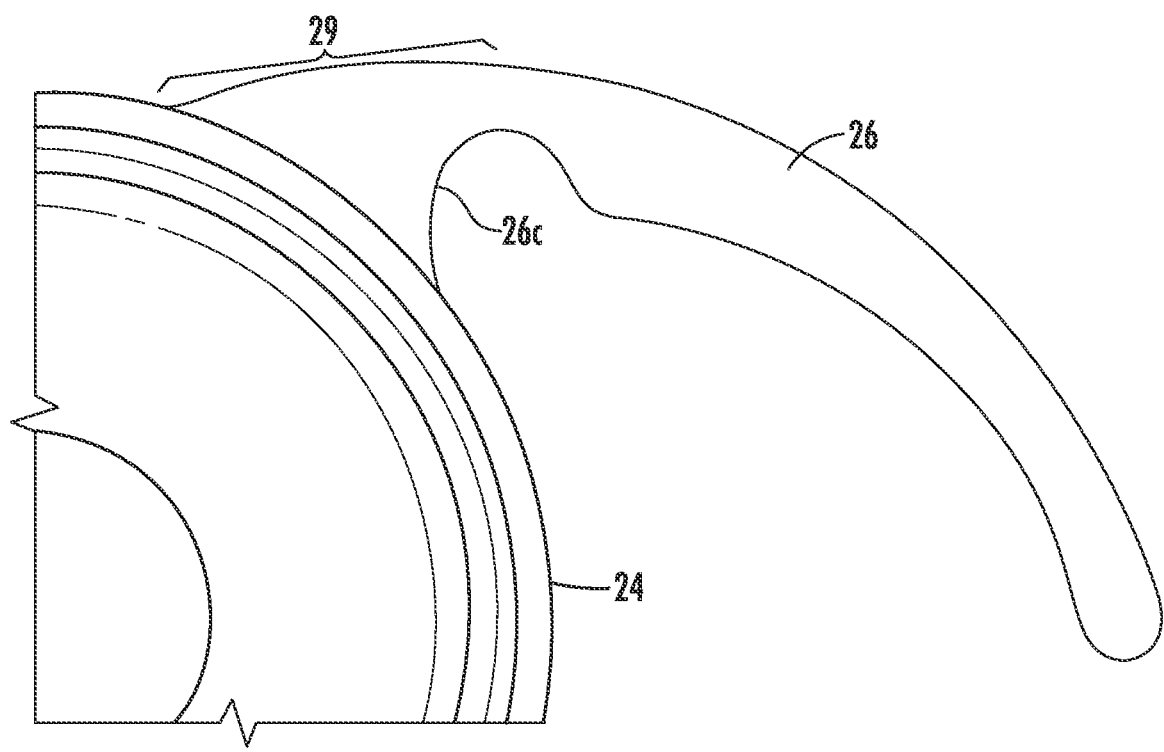
FIG. 3 is an enlarged view of a portion of the mold insert.

In one aspect, the first cut and the second cut are each performed using cutting paths or profiles that begin and end at transitional or transition regions 29 of the supporting portion 26. As used herein, the term transitional region 29 refers to an area positioned away from the optical portion 24 that is relatively adjacent to the optical portion 24 and away from a terminal end of the supporting portion 26. The transitional regions 29 are defined on the supporting portions 26, in one aspect, in an area intersecting with the optical portion 24. The transitional region 29 can be defined on a proximal end of the supporting portion 26 relative to the optical portion 24. FIG. 3 illustrates one example of a transitional region 29. The transitional region 29 can be defined on a region of the supporting portion 26 that is adjacent to the optical portion 24 and has a convex profile, in one aspect. In one aspect, the term transitional region 29 refers to the first 10%-20% of an extent of the supporting portion 26 that connects to the optical portion 24. In one aspect, the transitional region 29 extends between a connection point or interface between the optical portion 24 and the supporting portion 26 on a first end, and a portion of the supporting portion 26 with a smallest thickness on second end.

In one aspect, the first cut (shown in FIG. 2A) is performed using at least one first wire, and the second cut (shown in FIG. 2B) is performed using at least one second wire. A diameter of the second wire is smaller than a diameter of the first wire, in one embodiment. In another embodiment, the diameters are the same. In a still further embodiment, the diameters are different. In one aspect, the first wire has a diameter of 0.25 mm, and the second wire has a diameter of 0.15 mm. In one aspect, the first wire has a diameter of 0.20 mm-0.30 mm, and the second wire has a diameter of 0.10 mm-0.20 mm. One skilled in the art would understand based on this disclosure that the wire diameters can vary and can be selected to achieve a desired roughness of the mold insert 20.

Returning to FIG. 7, step 150 of the method 100 includes performing an additional, detachment, or third cut (P3, P3') to remove the mold insert 20 from a remainder of the stock material. In one aspect, this third cut is not required, and the mold insert 20 can be removed during the second cut. This cutting step is shown in FIG. 2C. In one aspect, removal of the mold insert 20 from the stock material is performed using two different cutting paths that each begin and end on transitional regions 29 of the supporting portion 26. The third cut, which is essentially cutting the mold insert 20 loose from the stock material, may use a different cutting procedure, apparatus, or configuration than the first cut and the second cut. In one aspect, a cutting wire with a 0.15 mm diameter is used to cut the mold insert 20 loose via EDM. In one aspect, the cutting wire has a diameter of 0.10 mm-0.20 mm. The connections between the mold insert 20 and the stock material are also known as bridges, which essentially serve as the final remaining connection between the mold insert 20 and the stock material. The stock material 15 is shown in FIG. 2D with multiple mold inserts (illustrated by 20') already removed or cut out. FIG. 2D also illustrates the starting and ending points (A1, B1, A2, B2) for the cuts.

Figure 2E:
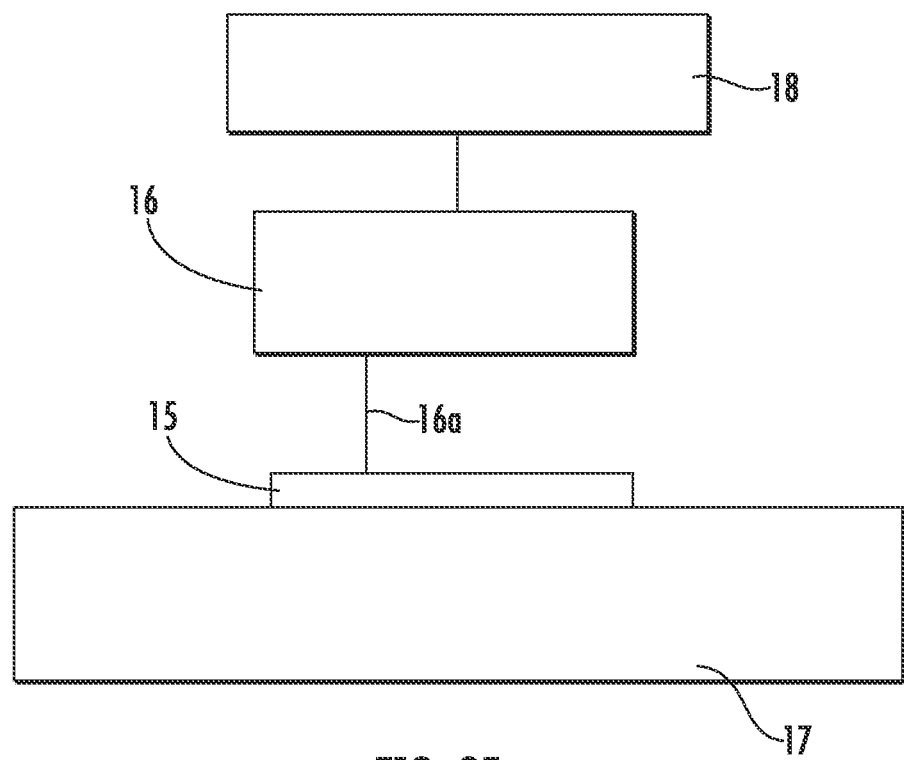
FIG. 2E is a schematic illustration of an EDM wire cutting configuration.

FIG. 2E illustrates a schematic exemplary EDM wire cutting arrangement for performing the cutting steps. As shown in FIG. 2E, a cutting tool 16 is arranged above the stock material 15, which is supported on a work surface 17. At least one cutting wire 16a of the cutting tool 16 is configured to perform the cutting steps on the stock material 15 to form mold inserts 20. An electronic or control assembly 18 can be provided that includes a power source, actuators or drivers, controllers or a control system, an electronics system, and other components or elements configured to drive the cutting tool 16 or position the work surface 17 relative to each other to carry out the cutting processes.

In any one or more of the cutting steps described herein, parameters of the EDM cutting process can vary during or along the cutting paths. For example, any one or more of the following parameters can vary: active pulse or voltage time, pulse shape (i.e., triangular, rectangular, etc.), pulse voltage or current, spark voltage, wire drum speed, wire tension, power, and frequency. Parameters regarding application and volume of coolant, as well as the type of wire can vary. Any one or more of these modifications can alter a roughness of the mold insert 20. In one aspect, increasing the current that is applied during the EDM cutting process increases the roughness of the workpiece being cut, i.e. the mold insert 20. Accordingly, in order to provide a rougher surface along the haptic arms or supporting portions 26, the current can be increased while cutting the profiles for the haptic arms or supporting portions 26 relative to the current used while cutting the profile for the optical portion 24. Roughness of the workpiece also generally increases as the active time or pulse time increases. Accordingly, specifically segmenting each cutting step into a first and second cutting path allows for the roughness of the mold insert 20 to be more precisely controlled because the cutting paths or steps are shortened.

Figure 4A:
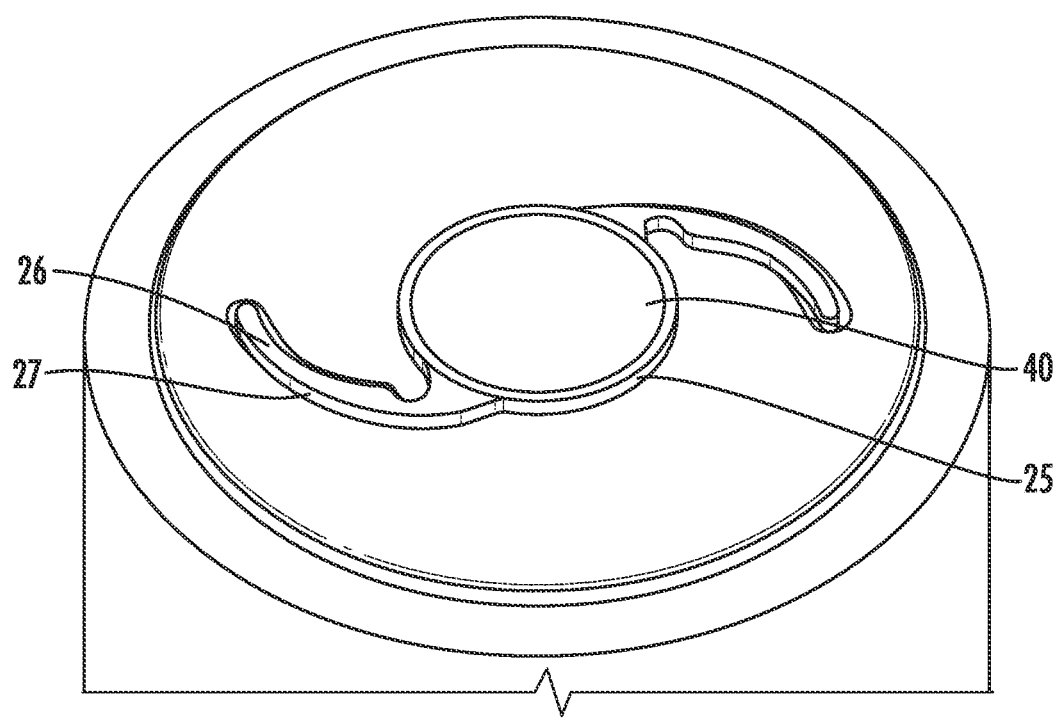
FIG. 4A illustrates the mold insert assembled with the molding assembly.

The mold insert 20 formed according to the cutting techniques and processes disclosed herein includes a predetermined roughness or surface characteristics along its periphery. As shown in FIG. 4A, the optical portion 24 has a peripheral surface 25 having a first roughness value, while the supporting portions 26 have peripheral surfaces 27 having a second roughness value that is different than the first roughness value. As used herein, the term peripheral surface generally refers to a lateral surface or side surface of an element. In one aspect, the first roughness value (i.e. roughness value of peripheral surface 25) is SPI B1 to D3, with a Ra of 0.3 μm-2.8 μm, and the second roughness value (i.e. roughness value of peripheral surface 27) is SPI D1, with an Ra of 0.8 μm-0.9 μm, and Rz of 3.5 μm-5 μm. In one aspect, the first roughness value (i.e. roughness value of peripheral surface 25) is SPI D2 to C3, and the second roughness value (i.e. roughness value of peripheral surface 27) is SPI D3 to D1. One of ordinary skill in the art would understand from the present disclosure that these values may vary, particularly depending on the type of lens being manufactured. For example, a toric lens typically requires different roughness values and characteristics than a standard lens.

By using the cutting methods disclosed herein, heat generated by the EDM cutting wire is applied to the mold insert 20 in a relatively symmetric manner. This provides a roundness value of approximately 0.005 mm for the cut peripheral surfaces. The disclosed methods provide a reduction of roundness of by a factor of two, i.e. from 0.01 mm down to 0.005 mm. Based on the disclosed subject matter, a symmetric process of EDM cutting is provided that leads to more symmetric heat distribution between the part being cut (i.e. element 20), and a remainder of the material (i.e. stock material). The part being cut is allowed to cool down after half a cutting stroke or profile as compared to a cutting path that extends around the entire part. Additionally, the cutting processes disclosed herein ensure that a minimal amount of cutting is required during the third cutting step to remove the mold insert 20 from the stock material 15. By minimizing the path of the third cutting step, less heat is applied to the mold insert 20 and the pulse duration is shortened, which is desirable.

Figure 4B:
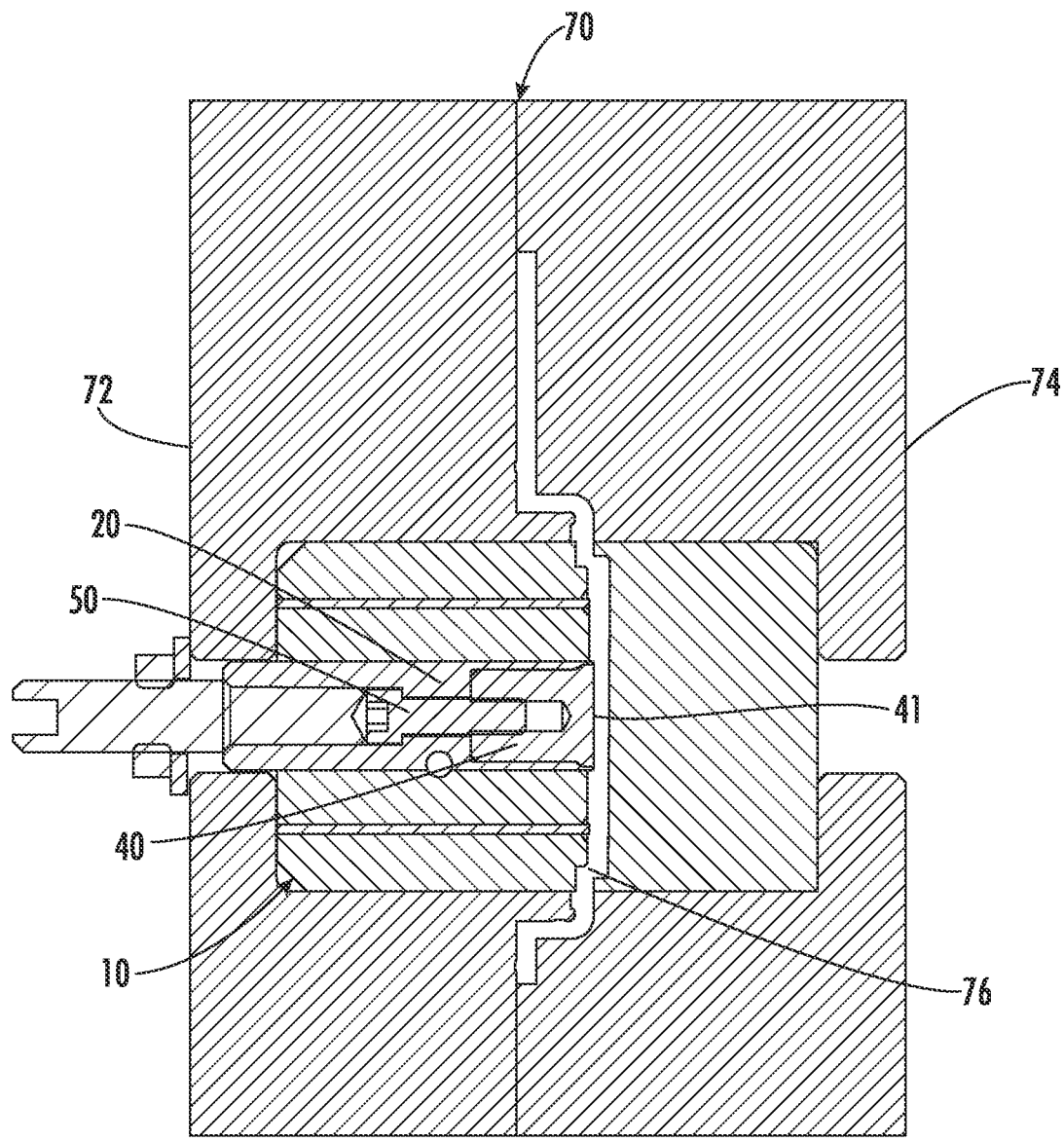
FIG. 4B illustrates the molding assembly arranged within a molding system.

After the cutting steps described herein, the mold insert 20 is ready for use or implementation with the molding assembly 10. As shown in FIG. 4B, the molding assembly 10, including the mold insert 20 with the features disclosed herein and the optical insert 40, is arranged within a molding system 70, and more specifically within a first molding portion 72. The first molding portion 72 is engaged with a second molding portion 74, and material is injected into a cavity or space 76 defined between the molding portions 72, 74 and the mold insert 20 and the optical insert 40 to form a first cup 78 including an IOL or lens mold 80 (shown in step 400c of FIG. 4C). The first cup 78 is also known as a bottom cup. In one aspect, the first cup 78 is formed from polypropylene. Any known formation or curing method can be used to form the first cup 78 in the cavity or space 76. The surface characteristics produced on the mold insert 20 (i.e. the first and second roughness values) are subsequently transferred or formed on the IOL mold 80. The IOL mold 80 is then used to form the IOL 90 as illustrated in FIG. 4C.

In one aspect, the IOL 90 is formed via cast molding from the IOL mold 80. FIG. 4C illustrates the steps associated with cast molding the IOL 90. As shown in step 400a, the first cup or bottom cup 78 including the IOL mold 80 is provided. The first cup 78 includes the IOL mold 80, which was formed using the assembly shown in FIG. 4B. A second cup or top cup, also known as a cap, 79 is mated with the first cup 78. In one aspect, the top cup 79 is formed using an injection molded cavity, similar to the process for forming the bottom cup 78. The top cup 79 is formed to include predetermined specific characteristics for the lens. One of ordinary skill in the art would understand that a similar cross section as the one shown in FIG. 4B can also be provided for formation of the top cup 79.

Figure 4D:
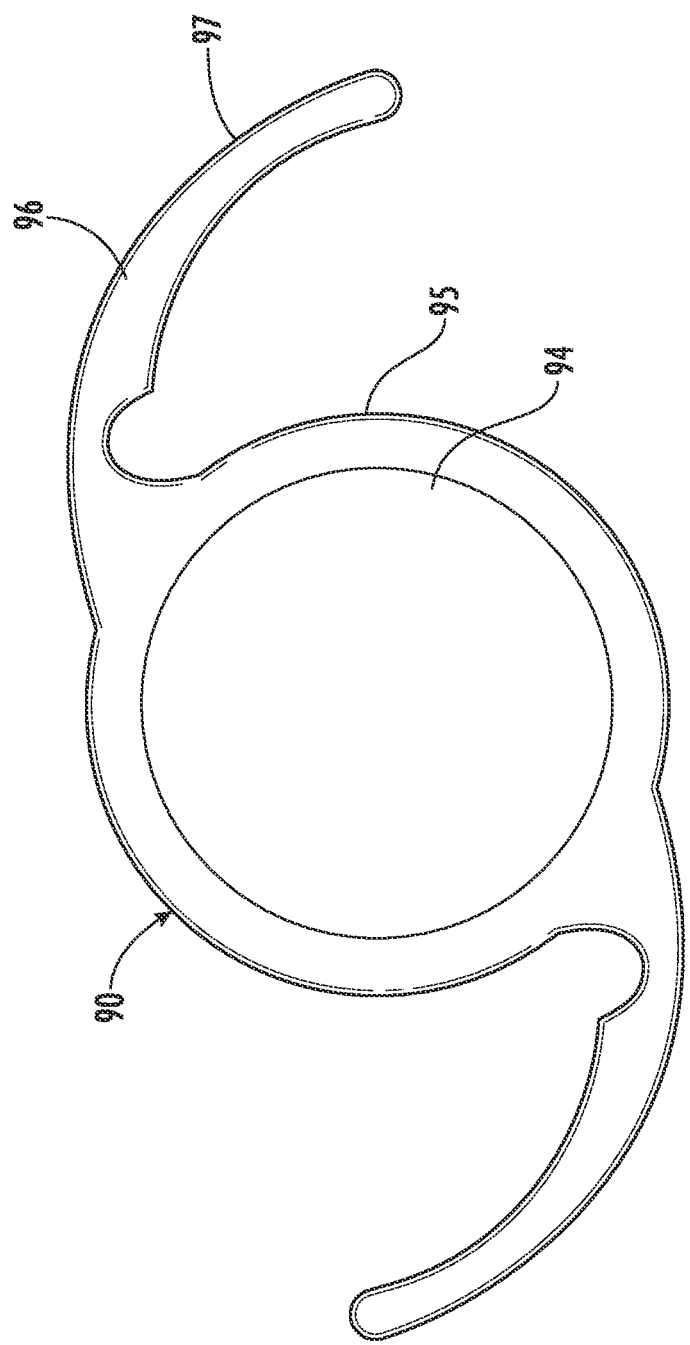
FIG. 4D illustrates an IOL formed by the cast molding steps of FIG. 4C.

During step 400a, material is injected into a cavity or space defined between the first cup 78 and the second cup 79 to form the IOL 90. Once the material hardens or is cured, step 400b of FIG. 4B includes removal of the second cup 79 or de-capping. Next, step 400c includes removal of the now formed IOL 90 or demolding from the IOL mold 80. As a result of these steps, the surface characteristics on the IOL mold 80 are imprinted or formed on the IOL 90 itself. One skilled in the art would understand based on the present disclosure that other formation means could be used to form the IOL 90, which is shown in FIG. 4D.

The surface characteristics produced on the mold insert 20 (i.e. the first and second roughness values) are subsequently transferred or formed on the IOL mold 80. As described above, the IOL mold 80 is used to form the IOL 90, as shown by FIG. 4C. One skilled in the art would understand based on the present disclosure that other formation means could be used to form the IOL 90 besides cast molding. The roughness or surface features along the peripheral surface of the mold insert 20 are essentially transferred to the IOL 90, via the IOL mold 80.

By altering the surface characteristics of the mold insert 20 via the EDM wire cutting steps, the resulting IOL 90 likewise has specific surface features. In one aspect, the supporting portions or haptic arms 96 of the IOL 90 have one set of surface characteristics and the optical portion 94 of the IOL 90 has another, different set of surface characteristics. For example, the peripheral surfaces 97 of the supporting portions or haptic arms 96 of the IOL 90 have a frosted appearance due to a predetermined surface roughness, while peripheral surfaces 95 of the optical portion 94 are clearer due to their relatively smoother surface. In one aspect, the roughened peripheral surfaces 97 of the supporting portions or haptic arms 96 of the IOL 90 increase the ability of the IOL 90 to remain in place, reduces any potential for rotation of the IOL 90 once implanted in a patient, and reduces glare.

Figure 5A:
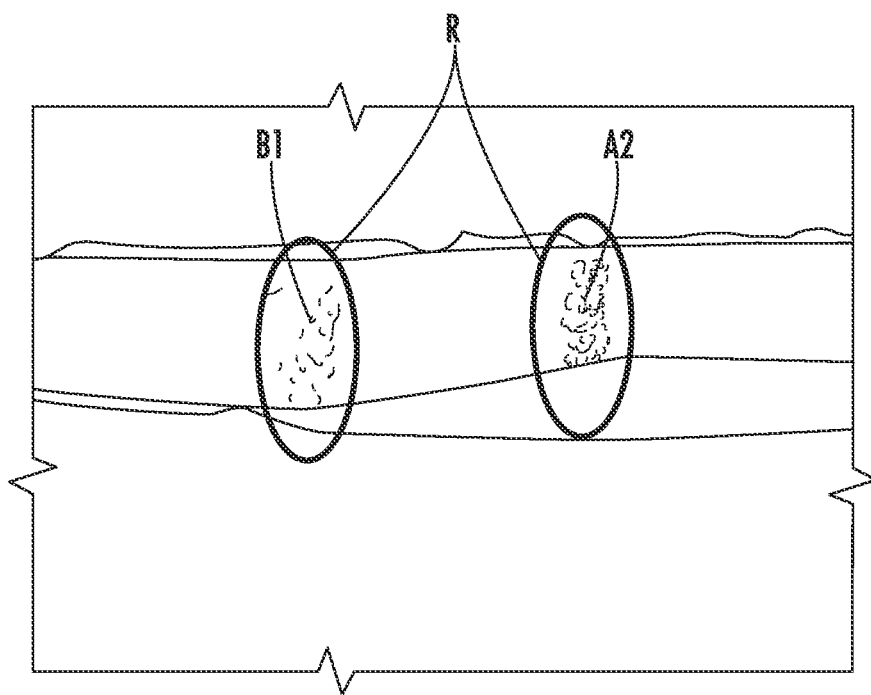
FIG. 5A illustrates a SEM cross-sectional rendering of an IOL formed using the mold insert disclosed herein.
Figure 5B:
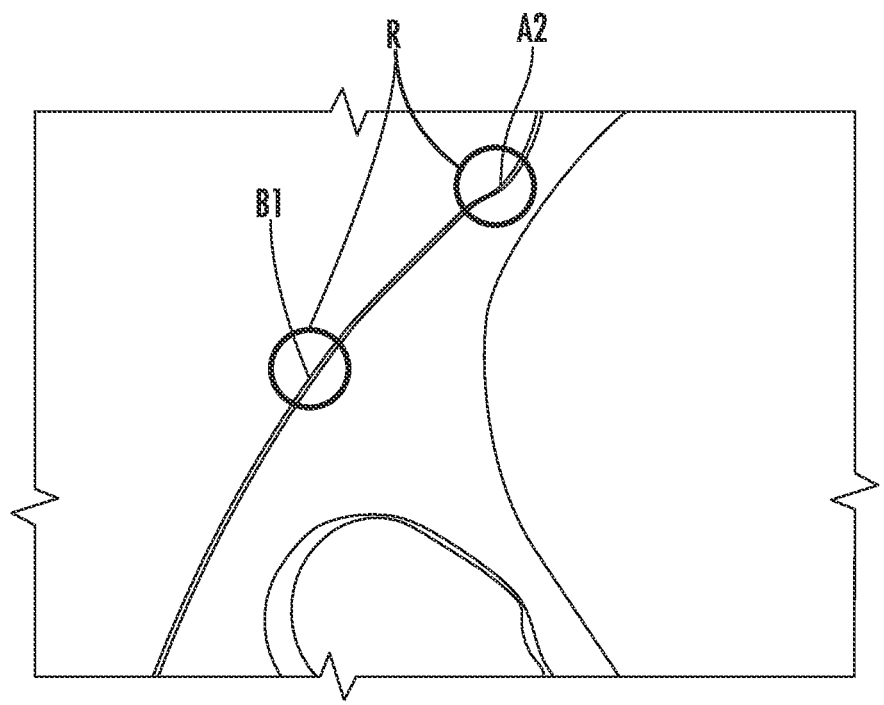
FIG. 5B illustrates a SEM top rendering of an IOL formed using the mold insert disclosed herein.

FIGS. 5A and 5B provide further detail regarding surface characteristics of the IOL 90. FIG. 5A shows the impact of the wire cutting instrumentation along a side of the IOL 90 based on the wire cutting pattern disclosed herein. FIG. 5B shows how the cutting pattern shown in FIG. 2C affects the side of the IOL 90. The starting point (A2) of one wire cutting step and ending point (B1) of another wire cutting step are shown in FIGS. 5A and 5B to specifically illustrate the minimal effects caused by the wire cutting starting and ending points. As a result of the wire cutting pattern beginning and ending in the regions described relative to FIGS. 2A-2C, corresponding regions (R) in FIGS. 5A and 5B illustrate relatively limited scarring or impact in regions of the IOL 90 that is formed by the mold insert 20 according to the processes and methods disclosed herein. In contrast, if the processes described herein with respect to forming the mold insert 20 are not adhered to, then the resulting IOL can include significant scarring or other imperfections. These scarring issues and imperfections are specifically avoided or minimized using the cutting processes and formation processes disclosed herein.

In one aspect, an IOL 90 is disclosed that includes an optical portion 94 and a supporting portion or haptic arm 96 produced via an IOL mold 80 formed from the molding assembly 70 including the mold insert 20. The mold insert 20 has an optical portion 24 and at least one supporting portion 26 extending from the optical portion 24. A peripheral surface 25 of the optical portion 24 has a first roughness value and a peripheral surface 27 of the supporting portion 26 has a second roughness value that is different than the first roughness value. In one aspect, the roughness value along the peripheral surface 25 is approximately SPI D1, with a Ra between 0.8 µm and 1.0 µm. In contrast, a roughness value of a lens surface (i.e. the optically accurate portion 41) of the optical insert 40 is SPI A1.

In one aspect, portions of the optical insert 40 can be formed by additional finishing steps. For example, the optically accurate portion 41 of the optical insert 40 may be formed using lathing. In one aspect, high speed diamond lathing may be used to form the optically accurate portion 41 to a specific finish.

In one aspect, the axial end faces of the mold insert 20, such as the axial end faces of the supporting portions 26 and the optical portion 24, are formed via an additional finishing process. In one aspect, the finishing process for these surfaces may include polishing. In one aspect, a polishing paste is applied to these surfaces during a polishing step. One of ordinary skill in the art would understand that additional processing steps may be associated with the mold insert 20, the optical insert 40, and any other components described herein.

The roughness value of the supporting portion 26 is equal to or greater than SPI B1 and less than SPI D3, in one aspect. The roughness value of the peripheral surface 27 is equal to or greater than SPI D1 and less than SPI D3, in one aspect. In one aspect, the roughness value of the peripheral surface 27 and the supporting portion 26 is less than 3.2 µm. In one aspect, the roughness of the supporting portion 26 and the peripheral surface 27 is selected to prevent reflection of visible light having a wavelength of 400 nm or greater. In one aspect, a frosted edge of the peripheral surface 27 is provided to prevent reflections on the side of the lens. Since visible light starts around 400 nm, the roughness on the side of this portion of the lens is specifically selected to correspond to the shortest wavelength in the visible light spectrum. In one aspect, the roughness values of the supporting portion 26 and the peripheral surface 27 may be on the same order of magnitude as the roughness of peripheral surface 25. In other words, the roughness can be selected to be on the order of 0.4 µm (400 nm), which is associated with SPI B2. For a toric IOL, this value can be rougher, as one of ordinary skill in the art would appreciate from this disclosure. In one aspect, the roughness value of the peripheral surface 27 can be greater than the roughness value of the peripheral surface 25. The roughness value of the peripheral surface 27 can be selectively made greater than the roughness value of the peripheral surface 25 by modifying the EDM wire cutting characteristics during the various cutting steps.

Figure 8:
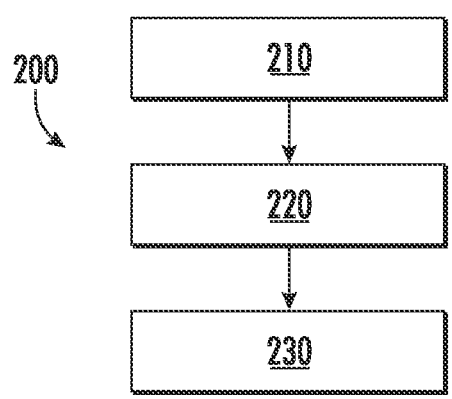
FIG. 8 illustrates a flow chart detailing method steps associated with forming the IOL.

In another aspect, as shown in FIG. 8, a method 200 of forming an IOL 90 is disclosed. Step 210 includes providing a molding assembly 10 including a mold insert 20, including the features disclosed herein with respect to the peripheral surface 25 of the optical portion 24 and the peripheral surface 27 of the supporting portion 26. The peripheral surface 25 of the optical portion 24 has a first roughness value, and the peripheral surface 27 of the supporting portion 26 has a second roughness value that is different than the first roughness value.

Step 220 includes forming an IOL mold 80 from the molding assembly 10. The IOL mold 80 includes an optical mold portion 84 and at least one supporting mold portion 86 extending away from the optical mold portion 84. A peripheral surface 85 of the optical mold portion 84 has a third roughness value that is associated with the first roughness value, and a peripheral surface 87 of the at least one supporting mold portion 86 has a fourth roughness value that is associated with the second roughness value. In one aspect, the third roughness value (i.e. surface 85) is approximately an SPI of B1 to D3, and the fourth roughness value (i.e. surface 87) is approximately an SPI of D1 or D2. In one aspect, the third roughness value is SPI D2 to C3, and the fourth roughness value is SPI D3 to D1. These roughness values of the IOL mold 80 correspond to the roughness values provided by the mold insert 20 due to the molding technique.

Step 230 includes forming the IOL 90 from the IOL mold 80, which can be performed or achieved using casting molding or any other known molding technique or processes. The resulting IOL 90 has an optical portion 94 with a peripheral surface 95 having a roughness associated with the third roughness value, and at least one supporting portion 96 having a peripheral surface 97 having a roughness associated with the fourth roughness value. In one aspect, the peripheral surface 95 of the optical portion 94 has a roughness of approximately SPI D1 or D2, and the peripheral surface 97 of the supporting portions 96 has a roughness of approximately SPI D1 or D2. In another aspect, the peripheral surface 95 of the optical portion 94 has a roughness of approximately SPI B1 to D3, and the peripheral surface 97 of the supporting portions 96 has a roughness of approximately SPI D3 to D1. These roughness values are essentially identical to the corresponding roughness values of similar portions defined by the IOL mold 80 and the mold insert 20.

Figure 6A:
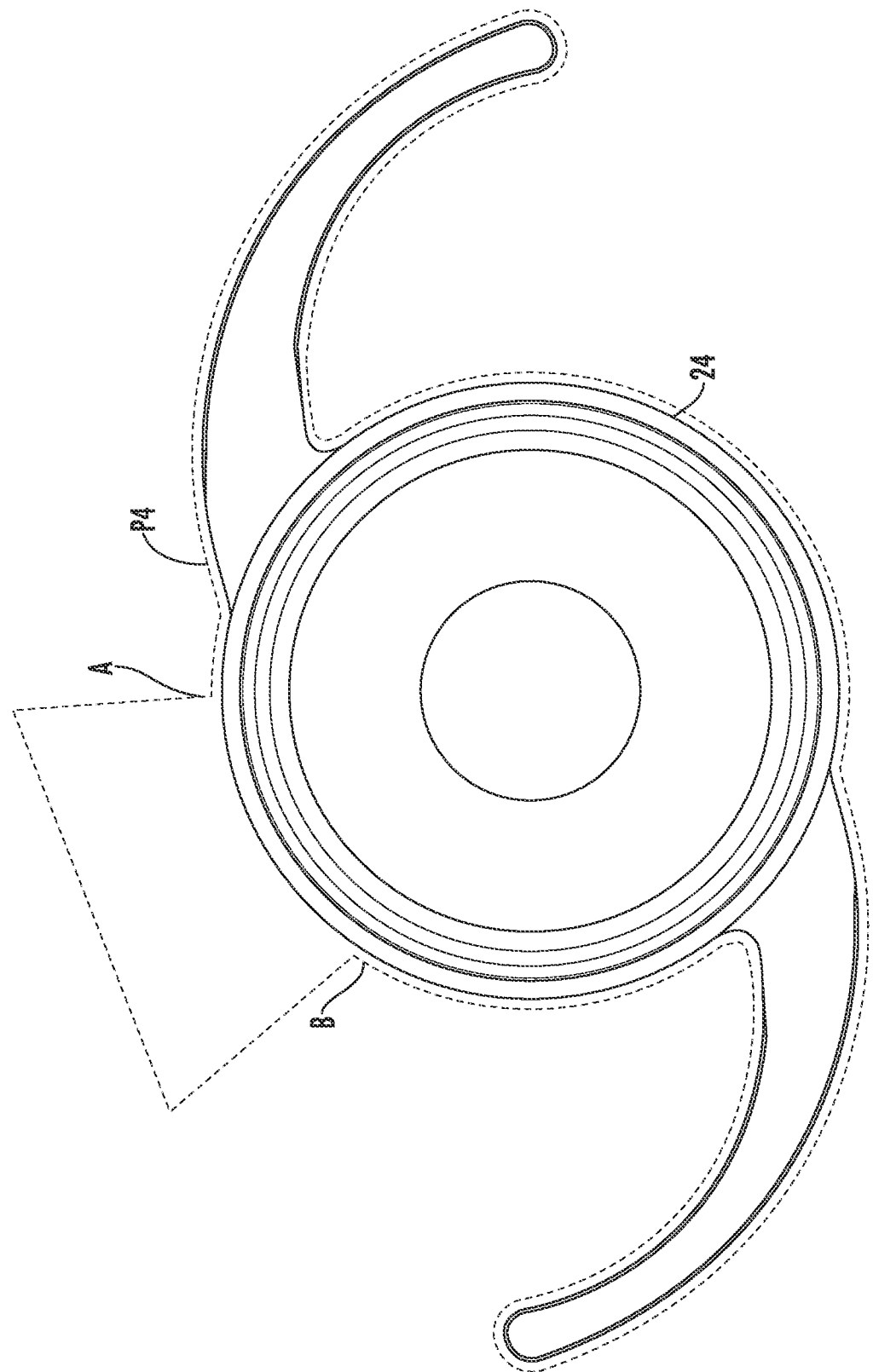
FIGS. 6A-6C illustrate an alternative cutting method for forming a mold insert.
Figure 6B:
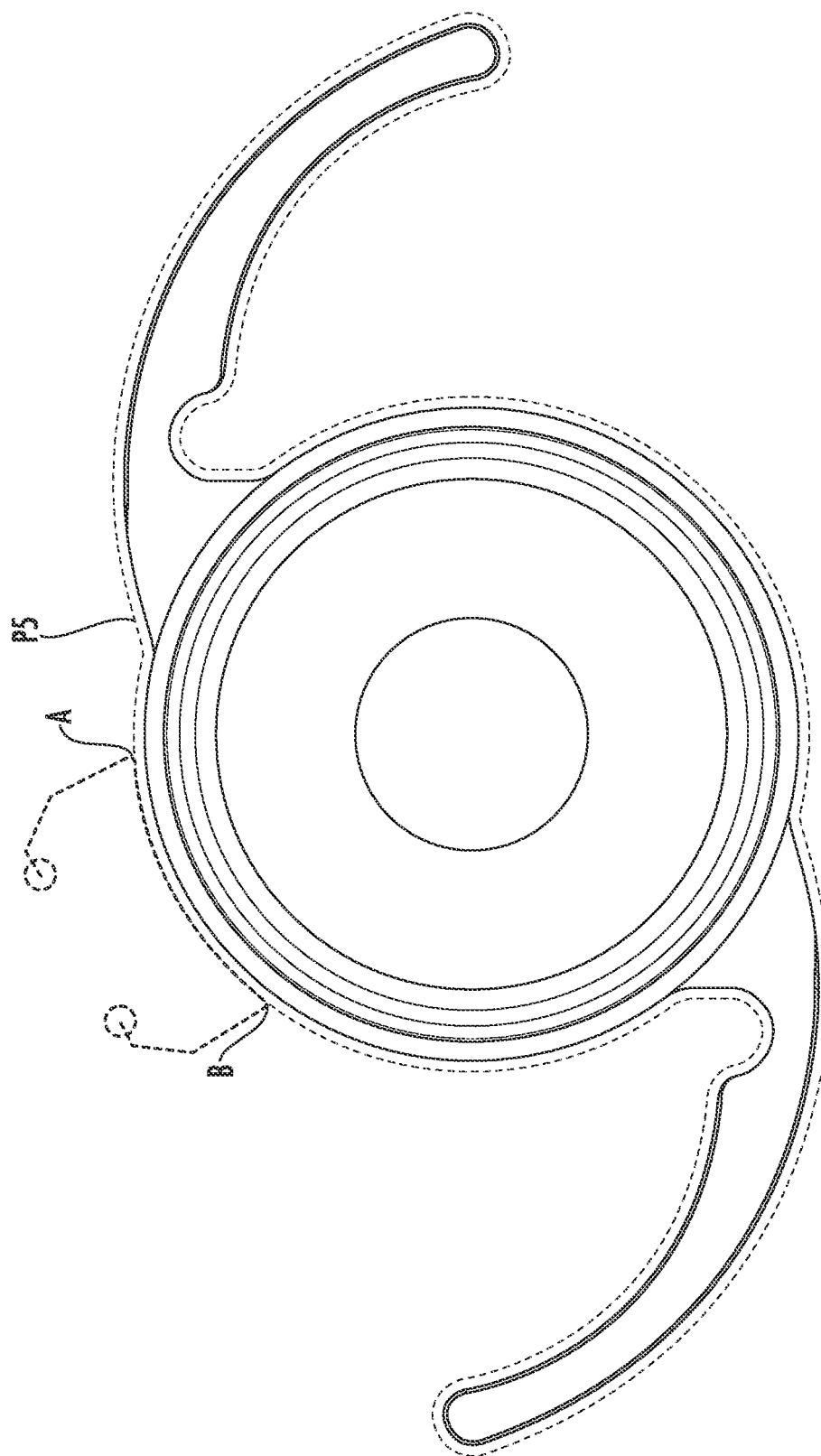
Figure 6C:
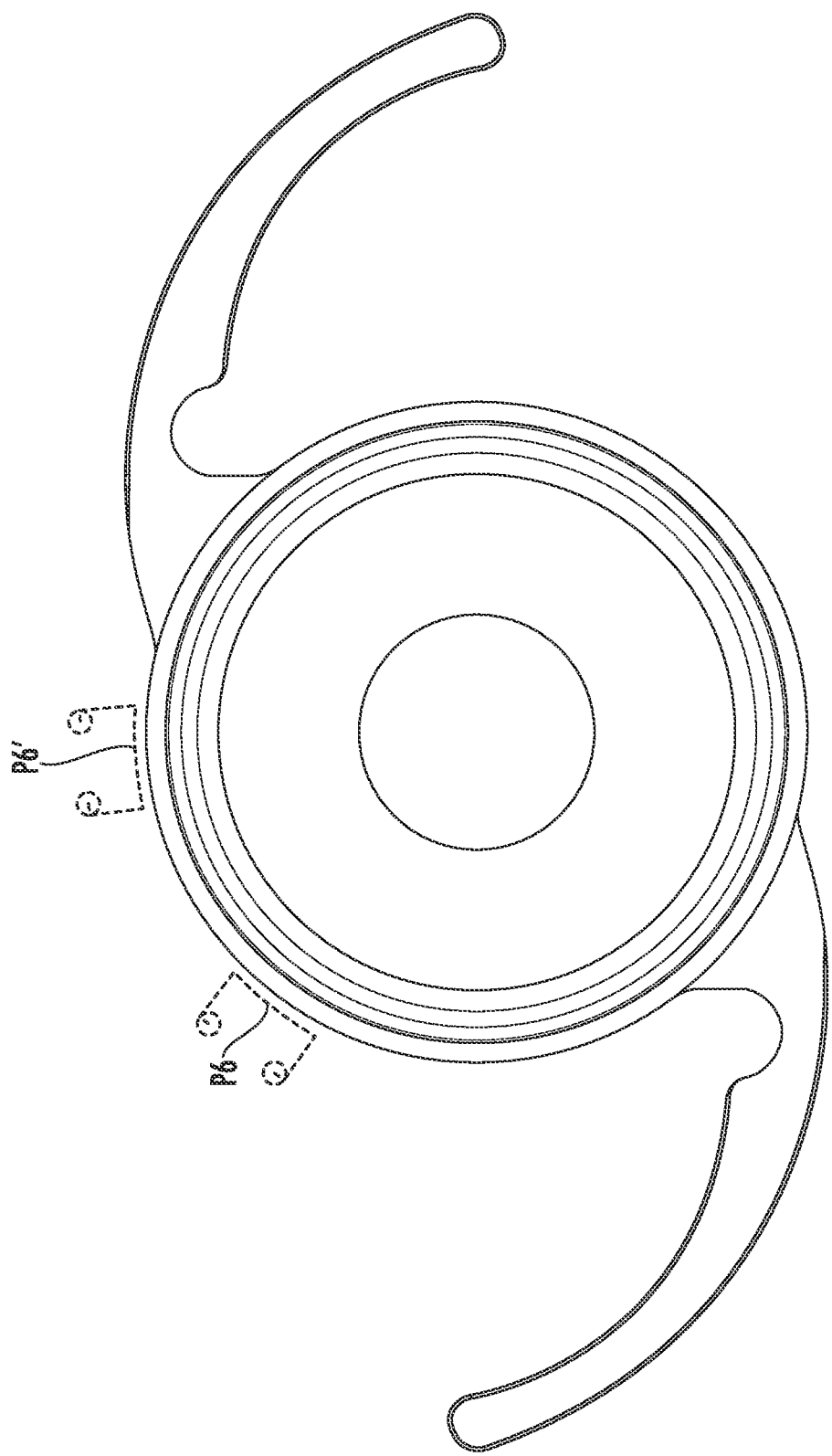

FIGS. 6A-6C illustrates an alternative method for forming the mold insert 20. As shown in FIG. 6A, a cutting path (P4) is used that has a single starting point or position (A) on the optical portion 24 and a single stopping point or position (B) on another region of the optical portion 24. The cutting steps associated with FIGS. 6A-6C are similar to FIGS. 2A-2C, and can include analogous cutting steps associated with FIGS. 2A-2C. FIG. 6A shows a first cutting step in which a general shape of the insert 20 is cut by an EDM wire cutting pattern P4. This cutting step corresponds to a rough contour having generally perpendicular entry and exit points. As shown in FIG. 6A, the start point (A) and the endpoint (B) for the cutting pattern are both on the optical portion 24. FIG. 6B illustrates a second cutting step in which an additional cutting path (P5) is implemented to machine around the armpits of the insert 20. This cutting step corresponds to a fine contour cutting step and a bridge removal step. FIG. 6C illustrates a final cutting pattern (P6, P6') in which the mold insert 20 is cut to remove the mold insert 20 from a base material. This cutting step removes the scars and any last remaining portions of material. FIGS. 6A-6C are associated with a cutting procedure in which a single cutting path is used for each of the cutting steps, and the starting and end points are on the optical portion 24 and not on the haptic arms or supporting portions 26.

When forming mold inserts, it is typical to begin the wire cutting process on a portion of the mold insert that is symmetrical and smooth, such as the optical portion of the mold insert or lens body. Beginning the wire cutting process at the optical portion is believed to provide easier access for the cutting wires relative to the mold insert. While it may be easier in some aspects during manufacturing to begin the cutting paths on the optical portions, this ultimately has undesirable effects on the finished mold insert. The present disclosure specifically does not start the wire cutting process on the optical portion, in one aspect, in order to avoid scarring or other undesirable deformations to the optical portion which can arise during the initiation of the wire cutting process.

Another known technique for forming mold inserts typically involves a single start and end point for wire cutting steps. This technique is used because it is generally less expensive and less labor intensive to align a single start and end point as compared to aligning multiple different start and end points as described in the present disclosure. The present disclosure specifically uses different start and end points for the wire cutting processes in order to provide improved control of the wire cutting parameters, which results in improvements relative to the surface characteristics of the mold insert.

In one aspect, the subject matter disclosed herein provides an improved configuration for providing a desired roughness on an IOL by forming the mold insert in a specific way and using a specific set of steps. The IOL is therefore formed in a specific way which does not require additional formation or assembly steps that are time consuming, labor intensive, expensive, or ineffective, such as chemical etching, sand blasting, lathing, or milling. In other words, the IOL does not require any post-formation processing or handling prior to patient use. The IOL, once formed as shown by the steps illustrated in FIG. 4C, is ready for patient use and implantation without additional handling.

Although the present disclosure illustrates a one-piece IOL, one skilled in the art would recognize from the present disclosure that the techniques disclosed herein can be used for other types of lenses that are not formed by multiple pieces.

The aspects and embodiments disclosed herein provide an improved process, method, and system for indirect or cast molding of a lens or IOL. Due to the principles of cast molding, any defects, such as scars, formed on the molding components (such as component 20) are replicated on the lens. Accordingly, the present disclosure provides an improved process, method, and system that addresses issues related to scarring that is replicated on a lens formed by cast molding. In one aspect, EDM wire cutting is used, with specific starting and end points or regions, in order to minimize, reduce, or eliminate scarring on the lens. In particular, scarring is both reduced and positioned or restricted to an area that minimizes its impact on a patient's vision after implantation.

The present disclosure specifically avoids multiple manufacturing steps typically associated with formation of a lens, and specifically required for formation of a toric lens. For example, formation of a toric lens can require lathing, as well as tumbling. During tumbling, the supporting portions or haptic arms must be protected. This process is labor intensive, and requires personnel to manually attach protection covers to the supporting portions or haptic arms prior to tumbling, and then manually remove the covers after tumbling. Therefore, the present disclosure provides improvements in manufacturing efficiencies and cost advantages due to limiting the number of manufacturing steps.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

What is claimed is:

1. A method of forming an intraocular lens (IOL), the method comprising:
    (i) forming a mold insert via electrical discharge machining (EDM) wire cutting around a periphery of the mold insert, wherein the EDM wire cutting is started and stopped in regions of the mold insert defined on at least one transitional region of at least one support portion;
    (ii) arranging the mold insert in a molding assembly to form an IOL mold; and
    (iii) forming the IOL from the IOL mold.

2. The method according to claim 1, wherein an optical portion of the mold insert has a peripheral surface with a roughness of SPI B1 to D3, and the at least one supporting portion of the mold insert has a peripheral surface with a roughness of SPI D1 or D2, and
    immediately after step (iii), the IOL has an optical portion with a peripheral surface having a roughness of SPI B1 to D3, and at least one supporting portion having a peripheral surface with a roughness of SPI D1 or D2.

3. The method according to claim 1, wherein the IOL does not require post-formation processing after step (iii) prior to patient use.

4. The method according to claim 1, wherein the EDM wire cutting includes a plurality of cutting steps, and at least two cutting steps of the plurality of cutting steps are implemented using two different cutting paths, the at least one transitional region includes a first and second transitional region, and the two different cutting paths each begin and end on one of the first or second transitional regions.

5. The method according to claim 4, wherein the two cutting paths are diametrically opposed relative to each other on the mold insert.

6. The method according to claim 1, wherein an electrical current of the EDM wire cutting is increased during cutting of the at least one support portion compared to an electrical current of the EDM wire cutting during cutting of an optical portion of the mold insert.

7. The method according to claim 1, wherein step (ii) includes injection molding and step (iii) includes cast molding.

8. The method according to claim 1, wherein the IOL has a varying peripheral surface roughness between a peripheral surface of an optical portion of the IOL compared to a peripheral surface of at least one support portion of the IOL.

9. The method according to claim 8, wherein a peripheral surface roughness of the optical portion of the IOL is less rough than a peripheral surface roughness of the at least one support portion of the IOL.

10. The method according to claim 1, wherein the IOL is a toric lens.

\* \* \* \* \*